(12) United States Patent
Valligny et al.

(10) Patent No.: US 6,218,474 B1
(45) Date of Patent: Apr. 17, 2001

(54) POWDERED THERMOPLASTIC POLYOLEFIN COMPOSITION HAVING RESILIENT PROPERTIES

(75) Inventors: Dominique Valligny; Tony Marciniak, both of Lille (FR)

(73) Assignee: Plastic Comnium Auto Interieur (FR)

( * ) Notice: Subject to any disclaimer, the term of this patent is extended or adjusted under 35 U.S.C. 154(b) by 0 days.

(21) Appl. No.: 09/091,499

(22) PCT Filed: Dec. 19, 1996

(86) PCT No.: PCT/FR96/02034

§ 371 Date: Aug. 19, 1998

§ 102(e) Date: Aug. 19, 1998

(87) PCT Pub. No.: WO97/22665

PCT Pub. Date: Jun. 26, 1997

(30) Foreign Application Priority Data

Dec. 19, 1995 (FR) .................................................. 95 15593

(51) Int. Cl.$^7$ .............................. C08L 23/00; C08F 8/00; B29C 41/18
(52) U.S. Cl. .......................... 525/194; 264/302; 525/240
(58) Field of Search ..................................... 525/194, 240; 264/302

(56) References Cited

U.S. PATENT DOCUMENTS

| 4,123,412 | 10/1978 | Fukuda et al. . |
| 4,212,787 | * 7/1980 | Matsuda et al. ..................... 521/240 |
| 5,840,229 | * 11/1998 | Sugimoto et al. ................... 264/302 |

FOREIGN PATENT DOCUMENTS 2268058  11/1975 (DE) .

* cited by examiner

*Primary Examiner*—Morton Foelak
(74) *Attorney, Agent, or Firm*—Millen, White, Zelano & Branigan, P.C.

(57) ABSTRACT

A thermoplastic polyolefin composition having resilient properties is provided for producing interior trims for motor vehicles by slush moulding. The composition contains (a) around 95–5 parts by weight, preferably 97–10 parts by weight of a matrix consisting of at least one polymer containing at least 50 mol % of propylene and at least one at least partially cross-linked polyolefin elastomer; (b) around 3–95 parts by weight, preferably 5–90 parts by weight of at least one polymer containing at least 50 mol % of ethylene; and (c) 0–6 parts by weight of an internal release agent per 100 parts by weight of components (a) and (b).

31 Claims, No Drawings

POWDERED THERMOPLASTIC POLYOLEFIN COMPOSITION HAVING RESILIENT PROPERTIES

FIELD OF THE INVENTION

The invention relates to a polyolefin thermoplastic composition having elastic properties, being in the form of fine particles conferring on it the character of a powder.

The invention relates more especially to a polyolefin thermoplastic composition having elastic properties, being in the form of a powder, for the production of skins by the process of powder slush moulding on conventional equipment.

The invention also relates to the process for preparing the said composition.

Finally, the invention relates to the moulded articles produced by the use of the composition.

TECHNICAL BACKGROUND OF THE INVENTION

Many components made of polymer materials are increasingly being used in the construction of motor vehicles: such as dashboards, door panels, consoles, etc. Some of them are used very visibly in the internal architecture of the vehicle, in such a way that they must have, on the visible surface, a pleasing aesthetic appearance which reproduces, for example, the appearance of leather. This visible surface constitutes the skin of the component. This skin, bulk coloured, must also have other properties, which are good scratch resistance and good resistance to chemicals such as solvents, as well as the ability to withstand thermal variations, ranging from the very cold to the prolonged exposure to sunshine in a confined atmosphere.

The abovementioned skin may concern all components (also called inserts) made of polymer materials, particularly those involved in the internal architecture of the vehicle—from the rigid inserts generally reserved for bottom-of-the-range vehicles to the foamed inserts with which more sophisticated vehicles are equipped.

In the case of rigid inserts, the skin, or at very least its appearance, is obtained by the etching of the mould, either as a result of the constituent material of the insert or else, for example, by the co-injection moulding of two different materials, one for the insert and the other for the skin.

In the case of foamed inserts, the skin is generally made, independently of the insert itself, of a material compatible, on the one hand, with the foam subsequently developed between the said skin and the insert and, on the other hand, with the finishing lacquers, such as polyurethane lacquers, deposited on the visible surface of the said skin in order to make them comply, where necessary, with the specifications of motor-vehicle manufacturers.

In order to produce the skin of inserts, such as the dashboard for example, various processes have been proposed, one of the preoccupations of which is to produce a skin with the lowest possible residual stress.

In a first type of process which uses a premanufactured polypropylene-based sheet, the skins of dashboards are produced by means of the process of positive or negative thermoforming. However, the thermo-forming employed, whether positive (the surface appearance of the skin exists on the sheet before thermoforming) or negative (the surface appearance is given to the sheet by the mould during thermoforming), generally involves, both for technical and economic reasons, sheets (preheated) which are preferably thin. Consequently, the shapes of the skins obtained are very limited and contain residual stresses which, when they are relieved by ageing, generate crazes which are very unattractive.

In one type of process, the skins of dashboards are produced using the slush moulding process (mentioned above) which generally allows them to be obtained free of residual stresses. By itself, the slush moulding process is a moulding process using conventional equipment (electroformed nickel mould heated by a hot-air system) which allows the production of the desired skins using a polymer powder based on polyvinyl chloride (PVC) by the technique of powder slush moulding. The skins thus produced, although they no longer include residual stresses, or very few residual stresses, and although they meet for the most part the specifications of motor-vehicle manufacturers, do have immediate or potential drawbacks, even in the short term.

Among the immediate drawbacks, the PVC-based skins are quite highly loaded, owing to their composition, with volatile substances (in particular, PVC plasticizers). These materials, in use and due to the effect of temperature variations in the passenger compartment of the vehicle, are volatilized and migrate to cold areas, where they condense—this is the well-known phenomenon of slow opacification of the windscreen of a vehicle, which is a particular impediment to the driver's view and to the proper control of the vehicle.

Among the potential drawbacks, the use of PVC appears, in the current situation of end-of-life recycling of materials used in the manufacture of motor vehicles, to be prohibited in the relatively short term for better environmental protection.

Polymer materials resulting from grinding up worn-out vehicles are currently used (completely or partly) as fuel in certain types of furnaces, such as, for example, furnaces in cement works. However, PVC converted into a fuel material emits, when it is burnt, acid-gas effluents which are harmful to the environment.

This is why, in order to meet the twin concern of motor-vehicle manufacturers and the public authorities, which is firstly that of protecting the environment (removing harmful gaseous effluents generated by the combustion of waste made of polymer materials and limiting the dumping thereof) and then that of more completely recycling the waste (formed from polymer materials) resulting from the destruction of worn-out vehicles by grinding, motor-vehicle manufacturers seriously envisage limiting the number of polymers present in each vehicle, but at the same time increasing their relative amounts, and in particular substituting PVC with polyolefins in order to allow easier recycling. Thus, motor vehicles would be equipped with components, such as foamed dashboards, whose skin, foam and rigid insert would be made of polyolefins which can be recycled at the end of the life of the vehicles.

To do this, polyolefin thermoplastic compositions have already been proposed.

By way of example, document EP 0,508,801 describes a powder composition of thermoplastic elastomers for powder moulding, which comprises:

either (i) a powder of a thermoplastic elastomer comprising a composition composed of an ethylene-alpha-olefin copolymer rubber and of a polyolefin resin;

or (ii) a powder of a thermoplastic elastomer comprising a partially crosslinked composition composed of an ethylene-alpha-olefin copolymer rubber and of a polyolefin resin, this powder composition being able to be used in the slush moulding process.

However, according to this document:

in order to increase melt flow and at the same time to improve the flexibility of the moulded article, the olefin copolymer rubber is diluted with oil and thus comprises an ethylene-alpha-olefin copolymer rubber with the addition of a mineral oil as a flexibilizer with a relatively high content with respect to the polyolefin elastomer. These oils constitute, in fact, a risk of emitting volatile substances which pollute the environment and opacify vehicle windscreens, and also a risk of impairing the appearance of the skin during its ageing—the phenomenon of exudation is not eliminated.

finally, in order to allow the skin to be easily demoulded, external mould-release agents (for example, dimethylsiloxane) deposited on the mould or mould-release agents internal to the composition.

(for example, methylpolysiloxane) are employed: they also constitute a risk of directly polluting the environment of the manufacturing workshops, but above all they make it more difficult to carry out the subsequent operation of lacquering the skins, this currently being necessary in order to make them comply with the specifications of motor-vehicle manufacturers (appearance, matt-gloss level, scratch resistance, abrasion resistance and resistance to chemicals, including solvents).

Another document, U.S. Pat. No. 5,302,454, also describes a thermoplastic polyolefin composition, having elastic properties utilizable in the automotive field, which is in a pulverulent form.

This composition includes three components:

the first being polypropylene (isotactic index of between 95 and 98) or a copolymer of propylene and of ethylene and/or of an alpha-olefin of the CH2=CHR type where R is an alkyl radical having from 2 to 6 carbon atoms, containing more than 85% by weight of propylene and having an isotactic index of greater than 85;

the second being a fraction of an ethylene-containing polymer (insoluble in xylene at room temperature);

the third being a fraction of an amorphous ethylene-propylene copolymer containing from 40 to 70% by weight of ethylene (soluble in xylene at room temperature).

However, such a composition appears not to be able, except by making certain modifications by adding special agents such as, for example, polyolefin resins, to be easily processed in the slush moulding process (risk of clumping and difficulty in demoulding).

Finally, another document, European Patent Application published under the number EP 0,637,610, describes a process and a thermoplastic polyolefin composition used in slush moulding for the manufacture of articles (laminating) which is in pulverulent form.

This composition includes three fractions:

the first (10 to 40 parts by weight) is a propylene homopolymer or a copolymer of propylene with ethylene and/or a C4 to C10 alpha-olefin;

the second (0 to 20 parts by weight) of a copolymer of ethylene and of propylene and/or a C4 to C10 alpha-olefin;

the third (50 to 80 parts by weight) of an elastomeric copolymer of ethylene and of propylene and/or a C4 to C10 alpha-olefin and optionally with a minor quantity of a diene.

According to this document, the desired intrinsic viscosity of the polymer composition used in the process in question may be obtained:

either directly by polymerization, controlled by agents for regulating the molecular weight;

or by subjecting the polymer composition to a "visbreaking" action which consists in cutting the molecular chains present by means of a peroxide.

Such a polymer composition has the same drawbacks as those mentioned previously.

Consequently, the problem of using polyolefin compositions as substitutes for polyvinyl chloride in the production of skins for the foamed or non-foamed covering of the inserts remains almost in its entirety.

Thus, the objectives of the invention are to provide a polyolefin composition having elastic properties, for the production of skins, which:

is in the form of a readily pourable fine powder, to be used in the slush moulding process;

has a substantially improved melting behaviour when it is in contact with the hot mould;

when being used, provides the skins with all the characteristics required by the functional specifications of motor-vehicle manufacturers, in particular good thermal, scratch and abrasion resistance and good resistance to chemicals including solvents;

allows the formation of skins having no residual stresses;

is compatible with the subsequent lacquering operations, should this lacquering be necessary;

does not contain agents having high vapour pressures;

does not manifest whitening phenomena at reverse tapers during demoulding or during subsequent handling of the skin;

allows excellent demoulding of the component formed;

can be completely recycled, after use, within the motor-vehicle product line in order to meet the environmental protection requirements; and meets the technical and economic requirements.

SUMMARY OF THE INVENTION

Aware of the above drawbacks, the Applicant has sought, through its research, to obtain a pulverulent polyolefin composition meeting the objectives that it has set itself.

According to the invention, the polyolefin thermoplastic composition having elastic properties, intended for the production of skins by slush moulding, being in the form of powder, which contains fractions, one being formed of a polypropylene-based homopolymer or copolymer, another being formed of an ethylene-based copolymer and the final one being formed of an elastomer, is characterized in that it is composed of:

a) from 97 to approximately 5 parts by weight and preferably from 95 to 10 parts by weight of a matrix composed of at least one polymer containing at least 50 mol % of propylene and of at least one at least partially crosslinked polyolefin elastomer;

b) from 3 to approximately 95 parts by weight and preferably from 5 to 90 parts by weight of at least one polymer containing at least 50 mol % of ethylene; and c) from 0 to 6 parts by weight of an internal mould-release agent per 100 parts by weight of components "a" and "b".

DETAILED DESCRIPTION OF THE INVENTION

Thus, the invention relates to a pulverulent polyolefin composition having elastic properties, processed using the slush moulding process, for the manufacture of skins, the desired essential characteristic of which is to have good melting in contact with the mould, preferably between 200° C. and 240° C.

But the invention also relates to a process for preparing this composition and to the articles moulded by processing the said composition.

According to the invention, the thermoplastic polyolefin composition having elastic properties firstly comprises a polymer matrix. This polymer matrix constituting component "a" of the composition is a blend which comprises at least one thermoplastic polymer containing at least 50 mol % of propylene and at least one at least partially crosslinked polyolefin elastomer.

The thermoplastic polymer containing at least 50 mol % of propylene used in component "a" may be polypropylene itself (the semicrystalline homopolymer) or else a semicrystalline propylene-ethylene copolymer, a blend of a semicrystalline homopolymer polypropylene and of semicrystalline propylene-ethylene copolymer, mentioned above, or else (homopolymer) polypropylene having amorphous and semicrystalline blocks, and propylene-ethylene or alpha-olefin copolymers having amorphous and semicrystalline blocks.

The semicrystalline propylene-ethylene copolymer used in component "a" contains small quantities of ethylene, generally lying between 2% and 5%, expressed by weight, so that essential properties, like the ease of processing by lowering the melting point of the matrix, the absence of whitening under impact and when folded and the ease of demoulding in the case of components with a reverse taper, are acquired.

The at least partially crosslinked thermoplastic polyolefin elastomer used in the composition of the matrix constituting component "a" may be chosen from thermoplastic elastomers:
  used alone, such as: ethylene-propylene rubber (EPR), ethylene-propylene-diene monomer (EPDM), styrene-butadiene-styrene (SBS), styrene-ethylene-butadiene-styrene (SEBS), styrene-butadiene rubber (SBR), this being at least partially crosslinked;
  or used as a blend, either in a reactor or by extrusion, of polypropylene with at least one elastomer, such as, for example, polypropylene/ethylene-propylene rubber (PP/EPR), polypropylene/ethylene-propylene-diene monomer (PP/EPDM), the elastomeric fraction of which is at least partially crosslinked.

The matrix of the polyolefin thermoplastic composition according to the invention is composed of, expressed in % by weight:
  from 5 to 95% and preferably from 80 to 20% by weight of at least one polymer containing at least 50 mol % of propylene; and
  from 95 to 5% and preferably from 20 to 80% by weight of at least one at least partially crosslinked polyolefin elastomer.

According to the invention, the polymer matrix constituting component "a" has a "melt flow index" (MFI), defined by the ASTM D 1238L standard (230° C. and 2.16 kg) lying between 5 and 100 g in 10 minutes and preferably lying between 25 and 70 g in 10 minutes and a flexural elastic modulus (FEM), defined by the ASTM D70 standard, at least equal to 20 MPa and preferably at least equal to 50 MPa.

The use of the various constituents of the aforementioned matrix in the composition according to the invention for slush moulding application leaves one to think that it might result in exudation of the low molecular masses of the elastomers present, which may represent up to 10% by weight of the total mass. However, as soon as the composition of the matrix is chosen in such a way that its flexural elastic modulus is at least equal to 20 MPa and preferably at least equal to 50 MPa, exudation is accordingly diminished.

In prior polymer compositions (according to PCT International Application published under the number WO95/35344) comprising elastomers, the exudation phenomenon was treated, often with only partial success, by means of agents such as resins chosen from the group of elastomers of the ethylene-propylene-diene monomer (EPDM) or ethylene-propylene rubber (EPR) type, these elastomers being uncrosslinked or at least partially crosslinked and preferably combined with polypropylene, which resins have a melting range onset temperature greater than 140° C.

Should there still be a risk of subsequent exudation from the polymer matrix, it is possible, in order to eliminate this phenomenon, to crosslink the various components by means of a suitable agent, such as a peroxide or a silane, or to chemically graft them by means of acrylic acid, methacrylic acid, alkyl acrylates or methacrylates, in which the alkyl is a $C_1$ to $C_8$ hydrocarbon chain, or maleic anhydride.

The matrix may be prepared by introducing at least one polymer containing at least 50 mol % of propylene and at least one at least partially crosslinked elastomer into a reactor or into an extruder and by mixing them therein.

Various additives of known type and commonly used in compositions intended for the slush moulding process may also be introduced into the composition according to the invention when preparing the mixture of the constituents of the matrix, or even subsequently when preparing the composition according to the invention by the processing of its various constituents "a", "b" and "c".

These various additives are, for example, heat or photochemical stabilizers, lubricants, antistatic agents, fire retardants, antioxidants, or yet others.

According to the invention, the thermoplastic polyolefin composition having elastic properties also includes at least one polymer containing at least 50 mol % of ethylene constituting component "b". This polymer may be low-density polyethylene (LDPE), linear low-density polyethylene (LLDPE), or else a blend of low-density polyethylene (LDPE) and a high-density polyethylene (HDPE), this blend containing at most 50% of HDPE, or else an ethylene-alpha-olefin copolymer in which the alpha-olefin is a C3 to C10 unit, such as, more specifically, ethylene-octene copolymers (POE) comprising between 5 and 40% by weight of octene, ethylene terephthalate copolymers (PET), ethylene-vinyl acetate copolymers (EVA), ethylene-alkyl acrylate copolymers or ethylene-alkyl methacrylate copolymers in which the alkyl is a C1 to C8 hydrocarbon chain, these being optionally modified by another monomer such as, for example, maleic anhydride, a copolymer of ethylene and of fluorocarbon monomer chosen among tetrafluoroethylene and fluorinated ethylene-propylene, or else ionomers which may or may not be in salt form. Preferably, the polymer containing at least 50 mol % of ethylene constituting component "b" has a melting range onset temperature at most equal to 140° C.

The ethylene-monomer-based polymer constituting component "b" of the composition according to the invention allows the melting behaviour of the said composition to be substantially improved and results in a finalized product being obtained whose characteristics are close to the specification usually imposed.

According to the invention, the thermoplastic polyolefin composition having elastic properties may include at least one internal mould-release agent constituting component "c".

The internal mould-release agent may be chosen from one of the conventionally known agents belonging to the group comprising the family of montanic derivatives and montanic ester derivatives, stearate salts, amines, amides, hydrogenated hydrocarbon resins, polyethylene, polypropylene and ethylene/vinyl acetate copolymer (EVA) waxes, and aliphatic and/or aromatic monomer copolymerization resins.

Preferably, the internal mould-release agent may be chosen from the group formed by the alkaline-earth metal stearates, of which calcium stearate is the most used, and the amides of stearic acid (C17H35-CONH2), such as ethylene-bis-stearamide (EBS), these substances being employed by themselves or as a blend.

The internal mould-release agent which, definitely, is preferably used in the composition according to the invention is magnesium stearate, for which the Applicant has found experimentally that the phenomenon of migration through the skin previously observed does not occur, and the characteristics of which are:

magnesium stearate [Mg(C18H3502)2]: fine powder
bulk density: 0.2 g/litre
melting point: approximately 140 to 150° C.
rate of metal: 4.5 to 5.1.

Magnesium stearate used as an internal mould-release agent has many advantages, the most notable of which are mentioned below:

it easily replaces, by itself, the pair consisting of calcium stearate/ethyl-bis amide in which the ethyl-bis amide, which reduces the melt viscosity of the polymer composition containing them, promotes, excessively, the migration of the calcium stearate to the mould/material interface;

it is used, for the same reason as calcium stearate, as an antioxidant for polypropylenes by limiting, or even preventing, thermo-oxidative degradation of the polymer at the surface, this being the cause of a reduction in the scratch, abrasion and solvent resistance properties;

its presence ensures excellent demoulding of the skin; and it allows the skin to be lacquered with good adhesion of the lacquer after a special preparation, such as flame brushing or the use of an adhesion primer.

The lacquering operation, if it is required, is usually carried out by a known means, such as by depositing a thin layer of polyurethane on the external surface of the skin or else by chemical grafting on the surface.

In practice, this lacquering operation has the purpose of substantially improving certain properties of the skin such as, for example, increasing the abrasion resistance, scratch resistance and solvent resistance, but also of allowing bonding of a paint, even locally, or adhesive bonding of an object having an aesthetically pleasing character, for example.

The internal mould-release agent may be introduced into the composition of the invention at the time of the mixing operation or when preparing the matrix constituting component "a", or else at the time when the said matrix is being mixed with the ethylene-based polymer constituting component "b", when the latter is used.

The internal mould-release agent is introduced into the composition preferably in an amount of from 0.1 to 6 parts by weight and very preferably in an amount of from 0.5 to 3 parts by weight per 100 parts by weight of components "a" and "b".

The composition according to the invention is prepared according to a manufacturing process which consists:

in mixing the constituents of the composition in an extrusion zone; and in cryogenically grinding the granules coming from the extrusion, in such a way that this results in a thermoplastic polyolefin powder having elastic properties.

Likewise, the composition according to the invention may be prepared by microgranulation, which consists of an extrusion through a microdie and a cutting at the level with the die in an aqueous medium, this resulting in a thermoplastic polyolefin powder having particles of almost spherical shape. The thermoplastic polyolefin powder according to the invention, obtained according to an adapted process such as, for example, those mentioned above, has a maximum particle size of approximately 400 $\mu$m and a median particle size of approximately 300 $\mu$m but preferably approximately 250 $\mu$m.

Unlike the PVC particles used in the prior slush moulding processes which, coming from a fluidized-bed process, have a substantially spherical shape promoting the flow of the powder when charging the mould, the thermoplastic polyolefin compositions, after they have been cryogenically ground, consist of microscopic particles which may have angular shapes.

This is why, in order to ensure better flow over the mould of the powder resulting from the cryogenic grinding of the composition according to the invention, to avoid local overcharging with this composition, whatever the shape of the mould, to charge the backtapers with powder and to decrease the thickness of the skins to be produced, it is desirable to introduce into the composition according to the invention a flow agent for powders of polyolefin compositions coming from cryogenic grinding and intended for the slush moulding process.

This flow agent is desirably a precipitated silica, of spherical shape, or an alumina, optionally grafted on the surface by a silane or by a silicone oil. If the precipitated silica or the alumina are grafted, they have the property of lowering, at discrete points, the melt viscosity of the composition and thus of penetrating more easily into the skin and of being well dispersed therein.

The amount of flow agent used in the composition according to the invention is between 0.1 and 10 parts and preferably between 0.1 and 5 parts by weight per 100 parts by weight of components "a" and "b".

By way of illustration, a precipitated and grafted silica, sold by Degussa under the reference SIPERNAT D10, used in the composition according to the invention as a flow agent, has the following properties:

white, loose, hydrophobic powder
BET specific surface area (DIN 66131 standard): 90 m2/g
average diameter of the agglomerates: 5 $\mu$gm
compacted density (DIN-ISO 787/XI standard): 100 g/l.

Certain pulverulent mineral substances may also be introduced into the composition according to the invention; they may be chosen from mineral salts and/or oxides which may or may not have undergone a surface treatment, such as calcium carbonate, magnesium carbonate, zinc carbonate, dolomite, lime, magnesia, aluminium trihydroxide, alumina, clays, preferably talc, kaolin, mica, bentonite, wollastonite and glass fibres and balls.

Finally, other organic pulverulent substances of natural or synthetic origin may also be introduced, such as, for example, colorants, carbon black or a finely ground polypropylene wax.

All these pulverulent substances may be used by themselves or in combination, and optionally introduced during the extrusion before granulation (compounding).

The dimensions of these mineral substances are generally between 0.01 and 300 μm and preferably between 0.1 and 100 μm.

These pulverulent mineral substances may be introduced into the compositions according to the invention in an amount of from 0.1 to 10 parts and preferably from 0.1 to 5 parts by weight per 100 parts by weight of components "a" and "b".

The compositions according to the invention may be prepared in a reactor or by extrusion or by powder-powder blending. Furthermore, they may be crosslinked by a peroxide or a silane or they may be grafted by acrylic acid, methacrylic acid, maleic anhydride or alkyl acrylates or methacrylates in which the alkyl is a C1 to C8 hydrocarbon chain.

The composition according to the invention is processed using the slush moulding process in order to produce skins intended to equip foam or unfoamed inserts such as, for example, dashboards, which meet, through tests, the most demanding requirements of motor-vehicle manufacturers.

If the composition does not contain an internal mould-release agent, the mould-release agent may be an external one and, in this case, it is deposited directly on the surface of the mould. This external mould-release agent may be chosen from the group consisting of the family of silicones, aliphatic and aromatic naphthas, polyphosphatides and oils well known to those skilled in the art.

However, in addition, the mould-release agent, whether internal or external, may be replaced by a surface treatment of the mould which makes it a non-stick surface.

The invention will be more clearly understood by virtue of the illustrative and non-limiting examples described below.

EXAMPLE 1

This example illustrates a composition according to the invention used subsequently in the manufacture of foamed dashboards.

The various components making up the composition according to the invention were as follows:

component "a": polymer matrix: 70 parts by weight of a blend of polypropylene and elastomer, composed of:
60 parts by weight of REXFLEX 2330 polypropylene sold by Rexene;
10 parts by weight of SANTOPRENE 121-50 M 100 sold by AES, composed of completely crosslinked EPDM and polypropylene;

component "b": ethylene-octene copolymer containing 25% octene (ENGAGE, reference SM 8400 from Dow Chemical): 30 parts by weight; and component "c": mould-release agent (magnesium stearate): 0.2 parts by weight per 100 parts of "a" and "b".

Added to this mould-release agent was a flow agent, in an amount of 0.3 parts by weight per 100 parts of "a" and "b", this being a precipitated silica of spherical shape onto which a silicone oil is grafted.

All these components, excluding the flow agent, were introduced into a twin-screw extruder which produced granules from the mixture of these various components. The granules thus prepared were cryogenically ground (in the presence of liquid nitrogen) at a temperature of between −40° C. and −70° C.

The polyolefin thermoplastic composition according to the invention collected from the said grinding was in the form of a fine powder whose median particle size was approximately 250 μgm and whose maximum particle size was approximately 350 μm.

The aforementioned flow agent was introduced, into the powder resulting from the cryogenic grinding, by means of a high-speed (Henschel) mixer.

Tests on the flow of the powder and on the production of skins by means of this powder were carried out using a nickel mould heated to a temperature of between 200° C. and 240° C. and have made it possible to obtain good-quality skins, of uniform thickness (1 mm), for the dashboard to be foamed.

Foamed dashboards were then produced and subjected to qualification tests for motor-vehicle manufacturers—they met the specifications.

EXAMPLE 2

This example illustrates another composition according to the invention, used subsequently in the manufacture of unlacquered foamed dashboards.

The various components making up the composition according to the invention were as follows:

component "a": polymer matrix: 90 parts by weight of a blend of polypropylene and elastomer, composed of:
70 parts by weight of REXFLEX D400 polypropylene sold by Rexene;
20 parts by weight of SANTOPRENE 121-50 M 100 sold by AES, composed of completely crosslinked EPDM and polypropylene;

component "b": ethylene-octene copolymer containing 25% octene (ENGAGE, reference SM 8400 from Dow Chemical): 10 parts by weight; and component "c": internal mould-release agent; 0 parts.

A flow agent was used in an amount of 0.2 parts by weight per 100 parts of "a" and "b". This agent is a precipitated silica, of spherical shape, onto which a silicone oil is grafted, to which agent 0.5 parts by weight of a silica sold by Degussa under the reference SIPERNAT 22S was added.

All these components, excluding the flow agent, were introduced into a twin-screw extruder which produced granules from the mixture of these various components. The granules thus prepared were cryogenically ground (in the presence of liquid nitrogen) at a temperature of between −40° C. and −70° C.

The polyolefin thermoplastic composition according to the invention collected from the said grinding was in the form of a fine powder whose median particle size was approximately 250 μm and whose maximum particle size was approximately 350 μm.

The aforementioned flow agent was introduced, into the powder resulting from the cryogenic grinding, by means of a high-speed (Henschel) mixer.

Tests on the flow of the powder and on the production of skins by means of this powder were carried out on a nickel mould heated to a temperature of between 200° C. and 240° C. and treated with an external mould-release agent (ZYVAX sold by Diatex). These tests made it possible to obtain good-quality skins, of uniform thickness (1 mm), for dashboards to be foamed.

Foamed dashboards were then produced and subjected to qualification tests for motor-vehicle manufacturers—they came very close to meeting the specifications.

EXAMPLE 3

This example also illustrates a composition according to the invention, used subsequently in the manufacture of non-pretreated unlacquered foamed dashboards.

The various components making up the composition according to the invention were as follows:

component "a": polymer matrix: 70 parts by weight of a blend of polypropylene and elastomer, composed of:
50 parts by weight of HIFAX CA131G polypropylene sold by Montell;
20 parts by weight of SANTOPRENE 121-50 M 100 sold by AES, composed of completely crosslinked EPDM and polypropylene;

component "b": ethylene-alkyl acrylate-maleic anhydride copolymer (LOTADER from Atochem): 30 parts by weight; and component "c": mould-release agent: 0 parts.

A flow agent was used in an amount of 0.2 parts by weight per 100 parts of "a" and "b", this being a precipitated silica, of spherical shape, onto which a silicone oil is grafted, to which agent 0.5 parts by weight of a silica sold by Degussa under the reference SIPERNAT 22S was added.

All these components, excluding the flow agent, were introduced into a twin-screw extruder which produced granules from the mixture of these various components. The granules thus prepared were cryogenically ground (in the presence of liquid nitrogen) at a temperature of between −40° C. and −70° C.

The polyolefin thermoplastic composition according to the invention collected from the said grinding was in the form of a fine powder whose median particle size was approximately 250 µm and whose maximum particle size was approximately 350 µm.

The aforementioned flow agent was introduced, into the powder resulting from the cryogenic grinding, by means of a high-speed (Henschel) mixer.

Tests on the flow of the powder and on the production of skins by means of this powder were carried out using a nickel mould heated to a temperature of between 200° C. and 240° C. and have made it possible to obtain good-quality skins, of uniform thickness (1 mm), for the dashboard to be foamed.

Foamed dashboards were then produced and subjected to qualification tests for motor-vehicle manufacturers—they also came very close to meeting the specifications.

What is claimed is:

1. A polyolefin thermoplastic composition having elastic properties, being in the form of a powder, intended for the production of skins, by slush molding, which contains fractions, one being formed of a propylene-based homopolymer or copolymer, another being formed of an ethylene-based copolymer and the final one being formed of an elastomer, characterized in that it is composed of:
a) from 97 to approximately 5 parts by weight of a matrix composed of at least one semi-crystalline polymer containing at least 50 mol % of propylene and of at least one at least partially crosslinked polyolefin elastomer;
b) from 3 to approximately 95 parts by weight of at least one non-crosslinked polymer containing at least 50 mol % of ethylene; and
c) from 0 to 6 parts by weight of an internal mold-release agent per 100 parts by weight of components "a" and "b"; and is free of mineral oil based softening agents.

2. A thermoplastic composition according to claim 1, characterized in that the polymer matrix "a" is composed of, expressed in % by weight:
from 5 to 95% and preferably from 80 to 20% by weight of at least one semi-crystalline polymer containing at least 50 mol % of propylene; and
from 95 to 5% and preferably from 20 to 80% by weight of at least one at least partially crosslinked polyolefin elastomer.

3. A composition according to claim 1, characterized in that semi-crystalline polymer containing at least 50 mol % of propylene of the polymer matrix "a" is chosen from the group consisting of semicrystalline homopolymer polypropylene, a semicrystalline propylene-ethylene copolymer, a blend of semicrystalline homopolymer polypropylene and of a semicrystalline propylene-ethylene copolymer, (homopolymer) polypropylene having amorphous and semicrystalline blocks, and propylene-ethylene or alpha-olefin copolymers having amorphous and semicrystalline blocks.

4. A composition according to claim 1, characterized in that the at least partially crosslinked polyolefin elastomer of the polymer matrix "a" is one of the elastomers belonging to the group consisting of ethylene-propylene rubber (EPR), ethylene-propylene-diene-monomer (EPDM), styrene-butadiene-styrene (SBS), styrene-ethylene-butadiene-styrene (SEBS) and styrene-butadiene rubber (SBR).

5. A composition according to claim 1, characterized in that the at least partially crosslinked polyolefin elastomer of the polymer matrix "a" is a blend of polypropylene with at least one of the elastomers ethylene-propylene rubber (EPR) and ethylene-propylene-diene monomer (EPDM), the elastomeric fraction of which is at least partially crosslinked.

6. A composition according to claim 1, characterized in that the components of the polymer matrix "a" are chemically grafted by means of acrylic acid, methacrylic acid, maleic anhydride and alkyl acrylates or methacrylates in which the alkyl is a C1 to C8 hydrocarbon chain.

7. A composition according to claim 1, characterized in that the polymer containing at least 50 mol % of ethylene forming the constituent "b" is chosen from the group consisting of low-density polyethylene (LDPE), linear low-density polyethylene (LLDPE), a blend of low-density polyethylene (LDPE) and a high-density polyethylene (HDPE), this blend containing at most 50% of HDPE, an ethylene-alpha-olefin copolymer in which the alpha-olefin is a $C_3$ to $C_{10}$ unit and, more specifically, ethylene-octene copolymers (POE) comprising between 5 and 40% by weight of octene, ethylene terephthalate copolymers (PET), ethylene-vinyl acetate copolymers (EVA), ethylene-alkyl acrylate copolymers in which the alkyl is a $C_1$ to $C_8$ hydrocarbon chain optionally modified by maleic anhydride, a copolymer of ethylene and of fluorocarbon monomer chosen among tetrafluoroethylene and fluorinated ethylene-propylene, and ionomers optionally in salt form.

8. A composition according to claim 7, characterized in that the polymer containing at least 50 mol % of ethylene forming constituent "b" has a melting range onset temperature at most equal to 140° C.

9. A composition according to claim 1, characterized in that the internal mould-release agent forming component "c" is from the family of montanic derivatives and montanic ester derivatives, stearate salts, amines, amides, hydrogenated hydrocarbon resins, polyethylene, polypropylene and ethylene/vinyl acetate copolymer (EVA) waxes, and aliphatic and/or aromatic monomer copolymerization resins.

10. A composition according to claim 1, characterized in that the internal mould-release agent forming component "c" is chosen from the group formed by alkaline-earth metal stearates, including calcium stearate, and the amides of stearic acid (C17H35-CONH2), including ethylene-bis-stearamide (EBS), these substances being employed by themselves or as a blend.

11. A composition according to claim 1, characterized in that the internal mould-release agent forming component "c" is magnesium stearate.

12. A composition according to claim 9, characterized in that the internal mould-release agent is introduced in an amount of from 0.1 to 6 parts by weight and very preferably in an amount of from 0.5 to 3 parts by weight per 100 parts by weight of components "a" and "b".

13. A composition according to claim 1, characterized in that it also includes additives which are heat or photochemical stabilizers, lubricants, antistatic agents, fire retardants and antioxidants.

14. A composition according to claim 1, characterized in that it includes a flow agent.

15. A composition according to claim 14, characterized in that the flow agent is a precipitated silica of spherical shape or an alumina optionally grafted on the surface by a silane or by a silicone oil.

16. A composition according to claim 14, characterized in that the amount of flow agent is between 0.1 and 10 parts and preferably between 0.1 and 5 parts by weight per 100 parts by weight of components "a" and "b".

17. A composition according to claim 1, characterized in that it contains pulverulent mineral substances chosen from mineral salts and/or oxides, which may or may not have undergone a surface treatment, belonging to the group consisting of calcium carbonate, magnesium carbonate, zinc carbonate, dolomite, lime, magnesia, aluminium trihydroxide, alumina, clays, preferably talc, kaoline, mica, bentonite, wollastonite, and glass fibres and balls.

18. A composition according to claim 1, characterized in that it contains pulverulent organic substances of natural or synthetic origin which are chosen from the group of colorants, carbon black or a ground polypropylene wax.

19. A composition according to claim 17, characterized in that the pulverulent substances are employed by themselves or as a mixture.

20. A composition according to claim 17, characterized in that the size of the pulverulent mineral substances is between 0.01 and 300 µm and preferably between 0.1 and 100 µm.

21. A composition according to claim 17, characterized in that the pulverulent mineral substances are introduced in an amount of from 0.1 to 10 parts and preferably from 0.1 to 5 parts by weight per 100 parts by weight of components "a" and "b".

22. A composition according to claim 1, characterized in that it is crosslinked by means of a peroxide or a silane.

23. A composition according to claim 1, characterized in that it is grafted by means of acrylic acid, methacrylic acid, maleic anhydride or alkyl acrylates or methacrylates, in which the alkyl is a C1 to C8 hydrocarbon chain.

24. Process for manufacturing a composition according to claim 1, characterized in that:
   the constituents of the composition are mixed in an extrusion zone;
   the granules of the mixture are cryogenically ground under conditions such that a maximum powder particle size of about 400 µm is obtained.

25. Process for manufacturing a composition according to claim 1, characterized in that it involves microgranulation by extrusion through a microdie and a cutting at the level with the die in an aqueous medium.

26. Moulded articles from a composition according to claim 1.

27. A polyolefin thermoplastic composition having elastic properties, being in the form of a powder, intended for the production of skins, by slush molding, which contains fractions, one being formed of a propylene-based homopolymer or copolymer, another being formed of an ethylene-based copolymer and the final one being formed of an elastomer, characterized in that it is composed of:
   a) from 97 to approximately 5 parts by weight of a matrix composed of at least one semi-crystalline polymer containing at least 50 mol % of propylene and of at least one at least partially crosslinked polyolefin elastomer;
   b) from 3 to approximately 95 parts by weight of at least one non-crosslinked polymer containing at least 50 mol % of ethylene; and
   c) from 0 to 6 parts by weight of an internal mold-release agent per 100 parts by weight of components "a" and "b" which is free of agents having high vapor pressures and which is free of mineral oil based softening agents.

28. A polyolefin thermoplastic composition having elastic properties, being in the form of a powder, intended for the production of skins, by slush molding, which contains fractions, one being formed of a propylene-based homopolymer or copolymer, another being formed of an ethylene-based copolymer and the final one being formed of an elastomer, characterized in that it consists essentially of:
   a) from 97 to approximately 5 parts by weight of a matrix composed of at least one semi-crystalline polymer containing at least 50 mol % of propylene and of at least one at least partially crosslinked polyolefin elastomer;
   b) from 3 to approximately 95 parts by weight of at least one non-crosslinked polymer containing at least 50 mol % of ethylene; and
   c) from 0 to 6 parts by weight of an internal mold-release agent per 100 parts by weight of components "a" and "b" which is free of agents having high vapor pressures and which is free of mineral oil based softening agents.

29. A composition as in claim 1, which is free of PVC plasticizers.

30. A polyolefin thermoplastic composition having elastic properties, being in the form of a powder, intended for the production of skins, by slushmolding, characterized in that it contains:
   a) from 97 to approximately 5 parts by weight of a matrix composed of at least one semi-crystalline polymer containing at least 50 mol % of propylene and of at least one at least partially crosslinked polyolefin elastomer;
   b) from 3 to approximately 95 parts by weight of at least one polymer containing at least 50 mol % of ethylene;
   c) from 0 to 6 parts by weight of an internal mold-release agent per 100 parts by weight of components "a" and "b", and
   d) which is free of mineral oil.

31. A polyolefin thermoplastic composition having elastic properties, being in the form of a powder, intended for the production of skins, by slush molding, characterized in that it contains:
   a) from 97 to approximately 5 parts by weight of a matrix composed of at least one semi-crystalline polymer containing at least 50 mol % of propylene and of at least one at least partially crosslinked polyolefin elastomer;
   b) from 3 to approximately 95 parts by weight of at least one polymer containing at least 50 mol % of ethylene; and c) from 0 to 6 parts by weight of an internal mold-release agent per 100 parts by weight of components "a" and "b";

wherein the semi-crystalline polymer containing at least 50 mol % of propylene is selected from the group consisting of semi-crystalline polypropylene homopolymer, semi-crystalline propylene-ethylene copolymers, blends of semi-crystalline polypropylene homopolymer and of semi-crystalline propylene-ethylene copolymers, polypropylene homopolymer having amorphous and semi-crystalline blocks, and propylene-ethylene or alpha-olefin copolymers having amorphous and semi-crystalline blocks, d) which is free of mineral oil.

* * * * *

UNITED STATES PATENT AND TRADEMARK OFFICE
CERTIFICATE OF CORRECTION

PATENT NO.        : 6,218,474 B1                                              Page 1 of 1
APPLICATION NO. : 09/091499
DATED             : April 17, 2001
INVENTOR(S)       : Dominique Valligny It is certified that error appears in the above-identified patent and that said Letters Patent is hereby corrected as shown below:

On Title Page Item (73) Assignee: "Plastic Comnium Auto Interieur" should read -- Plastic Omnium Auto Interieur --

Signed and Sealed this

Twentieth Day of February, 2007

JON W. DUDAS
*Director of the United States Patent and Trademark Office*